United States Patent [19]
Campbell

[11] 3,767,121
[45] Oct. 23, 1973

[54] FLUID DISTRIBUTION SYSTEM AND METHOD

[76] Inventor: George L. Campbell, 4333 E. Desert Crest Dr., Scottsdale, Ariz. 85251

[22] Filed: Apr. 28, 1972

[21] Appl. No.: 248,655

Related U.S. Application Data
[63] Continuation-in-part of Ser. No. 205,211, Dec. 6, 1971, abandoned.

[52] U.S. Cl.................. 239/272, 239/582, 239/587
[51] Int. Cl.............................................. A62c 31/22
[58] Field of Search.................... 239/272, 276, 551, 239/267, 271, 587, 582

[56] References Cited
UNITED STATES PATENTS

| | | | |
|---|---|---|---|
| 1,520,048 | 12/1924 | Baird | 239/272 |
| 2,196,456 | 4/1940 | Charroin | 239/272 |
| 1,527,222 | 2/1925 | Rasmussen | 239/551 |
| 2,563,300 | 8/1951 | Aker | 239/272 |
| 2,760,824 | 8/1956 | Leadbetter | 239/272 |
| 3,269,664 | 8/1966 | Lamb et al | 239/272 |
| 1,767,028 | 6/1930 | Williams | 239/276 |
| 3,563,471 | 2/1971 | Watkin | 239/587 |

Primary Examiner—Lloyd L. King
Attorney—William C. Cahill et al.

[57] ABSTRACT

A fluid distribution system incorporating a conduit combined with a plurality of distribution heads is shown. The conduit is continuous and does not contain prearranged stations or distribution points to accept the heads; the heads are formed with threaded shanks terminating at one end in an unthreaded portion having a cap formed thereon. A fluid channel extends along a portion of the threaded shank and the opposite end of the shank is tapered to a point. The conduit is connected to a source of fluid under pressure and placed along a path passing through fluid utilization areas. The heads are then utilized to puncture the conduit and are subsequently threaded in to the conduit, exposing the fluid channel therein to the interior of the conduit to provide a passageway for the escape of fluid from the conduit outwardly to the fluid utilization area.

4 Claims, 13 Drawing Figures

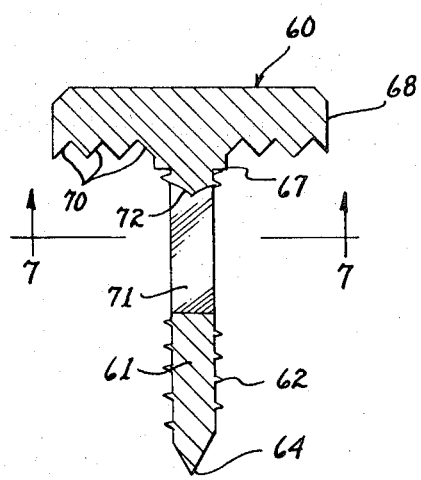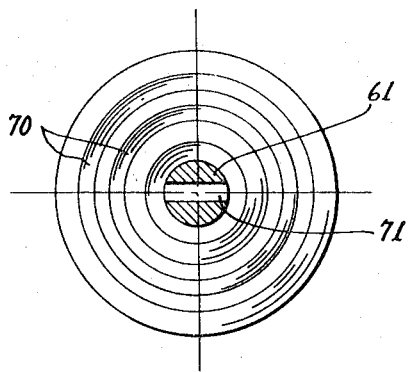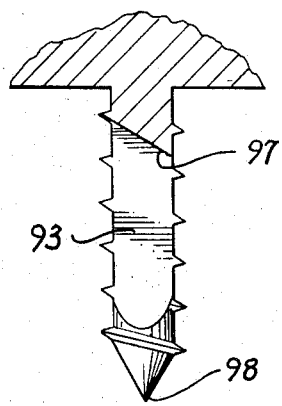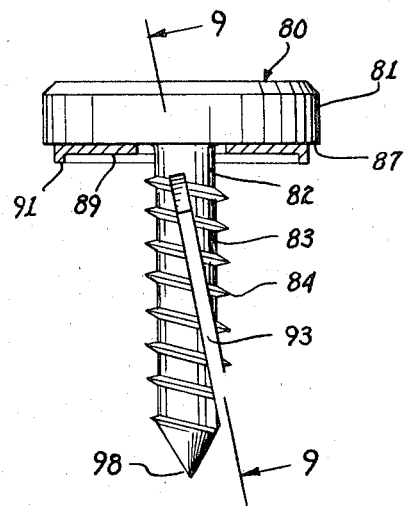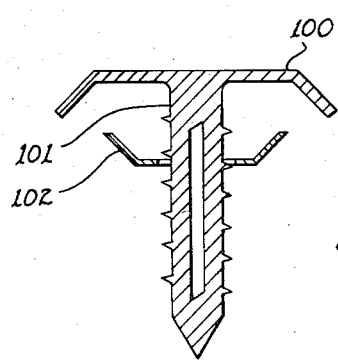

PATENTED OCT 23 1973

FLUID DISTRIBUTION SYSTEM AND METHOD

This application is a continuation-in-part of my co-pending application Ser. No. 205,211, filed Dec. 6, 1971, entitled "Fluid Distribution System and Method", now abandoned.

The present invention pertains to a fluid distribution system and method, and more particularly, to apparatus for distributing fluid from a source under pressure to predetermined areas of utilization.

In distribution systems, such as those found in ordinary plant watering arrangements, it is typical for a conduit to be placed underground along a line of shrubs or plants to be watered and permanent fittings to be attached to the conduit at intervals determined by the positions of the plants. The fittings are easily adjustable such that when water pressure is applied within the conduit, the respective fittings or outlets may be adjusted to permit an appropriate flow rate of water to escape to the area around the corresponding plant. Such distribution systems are sometimes known as bubbler systems or soaker systems and by their very nature are expensive and permanent.

Still other distribution systems sometimes utilize conduits, flexible or rigid, which incorporate a plurality of evenly spaced outlets which must be adjusted to the off position in the event a plant does not happen to be positioned at that particular point along the conduit. This type of distribution system is less expensive than that previously described but nevertheless remains expensive and incorporates outlet positions which are unnecessary when plants are not located at that outlet; further, since fluid utilization areas, such as plant watering wells, are seldom located at intervals corresponding to the intervals of the outlets, such distribution systems frequently are unable to provide a fluid outlet to all the plants in an array of plants.

It is therefore an object of the present invention to provide an inexpensive fluid distribution system.

It is another object of the present invention to provide a method for distributing fluid whereby the fluid may easily be distributed to a plurality of fluid utilization areas with little expense.

It is another object of the present invention to provide a fluid distribution system and method wherein an inexpensive conduit may be placed along a path determined by the fluid utilization area and fluid distribution heads subsequently secured to the conduit.

It is another object of the present invention to provide a fluid distribution system and method wherein a flexible conduit is utilized to transport fluid from a fluid source along a path determined by a fluid utilization area and wherein fluid distribution heads may be used to puncture the conduit and subsequently be secured to the conduit at the puncture.

These and other objects of the present invention will become apparent to those skilled in the art as the description thereof proceeds.

The present invention may be described by reference to the accompanying drawings, in which:

FIG. 6 is a cross-sectional view of a modified fluid distribution head.

FIG. 7 is a cross-sectional view of FIG. 6, taken along line 7—7.

FIG. 8 is a cross-sectional view of another modification of a fluid distribution head utilized in the present invention.

FIG. 9 is a cross-sectional view of FIG. 8, taken along line 9—9.

FIG. 10 is a cross-sectional view of another modification of a fluid distribution head utilized in the present invention.

For purposes of illustration, the present invention will be described in terms of a flexible garden hose to be utilized to water plants located at predetermined positions; it will be obvious to those skilled in the art that the distribution system of the present invention may be utilized in a great number of applications other than that being utilized to describe the invention.

Figure 1:
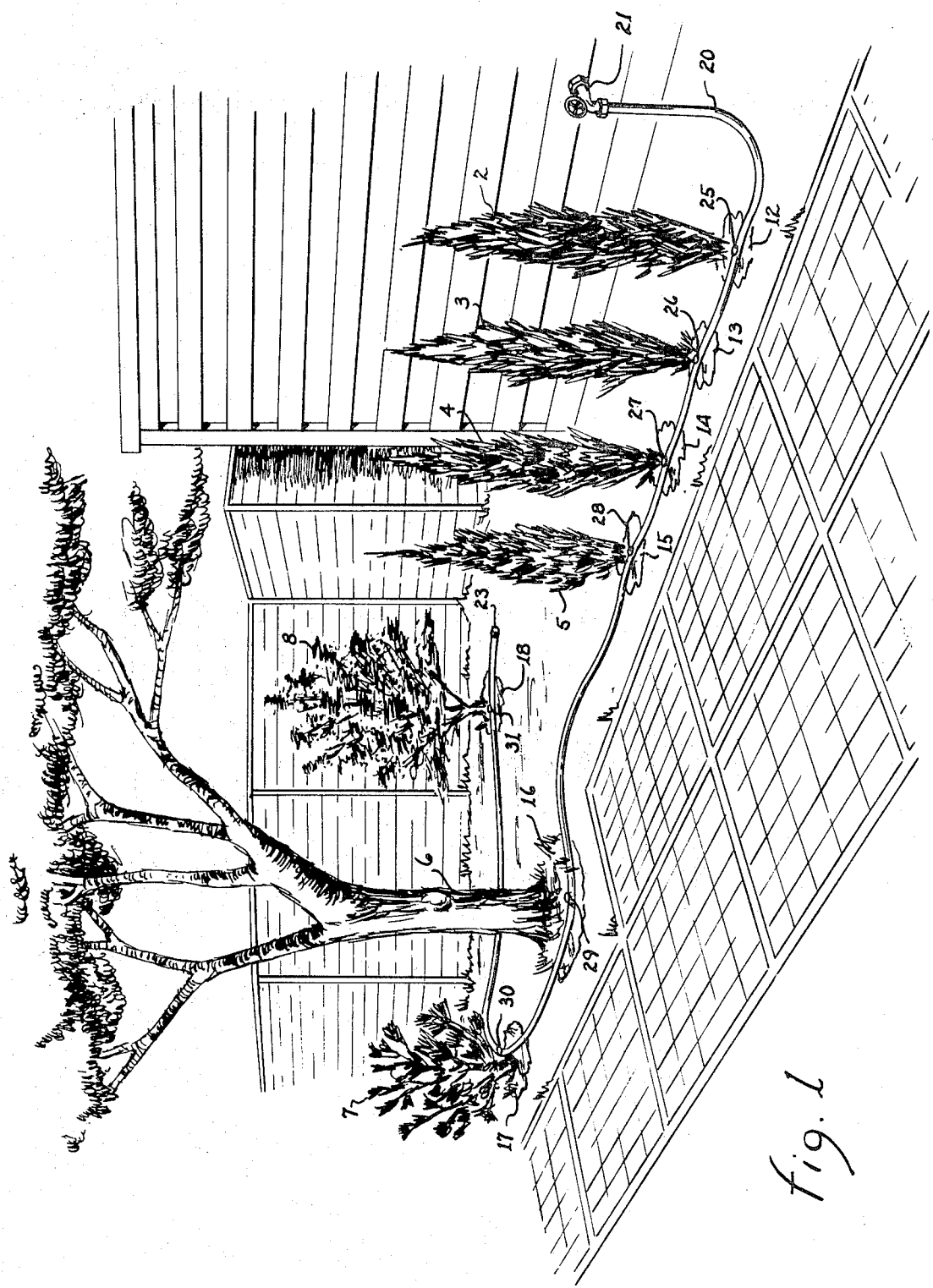
FIG. 1 is a pictorial representation of a fluid distribution system and method incorporating the teachings of the present invention.
Figure 2:
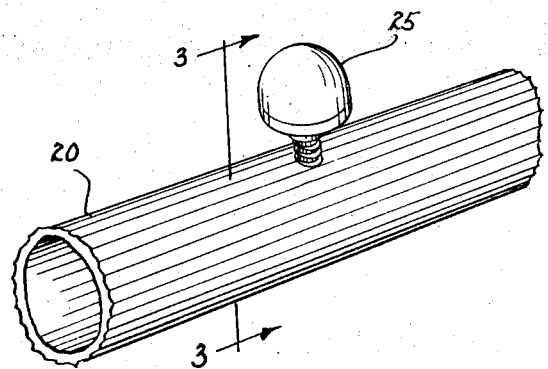
FIG. 2 is a perspective view of a portion of a conduit utilized in the present invention, showing a fluid distribution head mounted therein.
Figure 4:
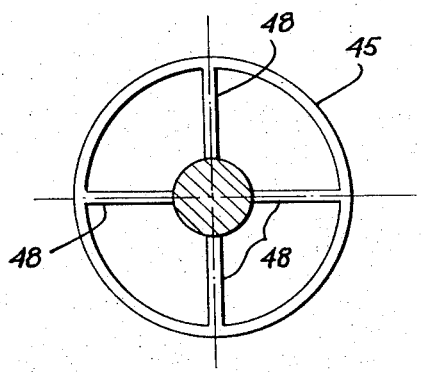
FIG. 4 is a cross-sectional view of FIG. 3, taken along line 4—4.
Figure 3:
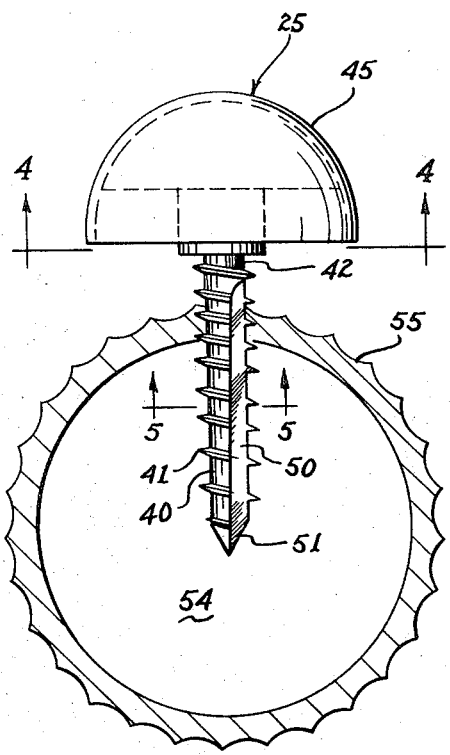
FIG. 3 is a cross-sectional view of FIG. 2 taken along line 3—3.
Figure 5:
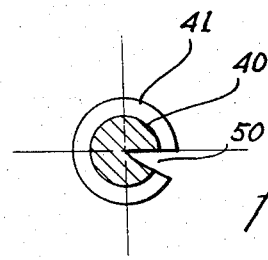
FIG. 5 is a cross-sectional view of FIG. 3, taken along line 5—5.

Referring now to FIG. 1, it may be seen that plants, trees, and shrubs 2 – 8 are to receive water. Each of the plants, trees and shrubs 2 – 8 includes a watering area or water utilization area 12 – 18 respectively. Ordinarily, to achieve desired soaking action, the water delivered to each of the water utilization areas should be delivered at a relatively slow rate to permit the water to soak into the ground; further, it will be apparent that each of the water utilization areas 12 – 18 is unique to the extent that the size of the area differes and the requirements of the respective plants, trees, and shrubs varies.

Water is supplied to these areas through the utilization of a conduit 20 which, as mentioned above in the present embodiment, is a flexible hose. The conduit is connected to a source of water under pressure 21 and may be capped at its opposite end 23. Spaced along the length of the conduit 20 are a plurality of fluid distribution heads 25 – 31. Since the fluid requirements of each of the water utilization areas 12 – 18 may vary, and also since the water pressure in the conduit 20 will vary from the position of the first water utilization area 12 to the position of the last water utilization area 18, each of the water distribution heads 25 – 31 is adjustable.

It may be seen from an inspection of FIG. 1 that the plants, trees and shrubs may be placed at regular and irregular intervals and that the position of the corresponding water utilization area is immaterial to the utilization and system of the present invention.

Referring now to FIGS. 2 – 5, a section of the conduit 20 is shown along with the water distribution head 25. In the embodiment chosen for illustration, the conduit is a continuous flexible water hose having the usual circular cross section and formed of rubber, plastic, or other material. It will be noted that the conduit does not contain any "stations" or distribution points; rather, the conduit is continuous and is not provided with outlets of any sort.

The head 25 incorporates a shank 40 that is threaded as shown at 41 and includes an unthreaded portion 42. The shank 40 terminates at its upper end in a cap 45. The cap is dome-shaped and is hollow; further, the cap is supported on the shank 40 by a plurality of radially extending arms 48.

A fluid channel 50 extends along a portion of the shank and is positioned substantially longitudinally of the shank. It may be noted that the channel 50 is of tapering depth and the edges 49 of the channel 50 are rounded or dulled for reasons to be explained more fully hereinafter. The tip 51 of the shank 40 is tapered to form a conduit-piercing point.

The conduit 20 is connected to a suitable source of water under pressure, and with the pressure off the conduit is layed along a path determined by the positions of the fluid utilization areas, the path passing through each of said areas. With the conduit thus distributed, the fluid distribution heads are then utilized to puncture the conduit with the conduit-piercing point thereon. Subsequent to puncturing the threaded portion of the shank, each of the heads engages the wall of the conduit and thus may be threaded into the conduit. The distribution heads may thus be placed at precisely determined positions in accordance with the locations of the plants to be watered.

Referring again to FIGS. 2 - 5, the interior of the conduit 54 will normally contain water under pressure which will escape through the fluid channel 50 to the exterior of the conduit. The volume or rate of flow of the water escaping from the conduit through the channel 50 may be varied by simply threading the head 25 further into or out of the conduit. To prevent scraping of the conduit wall 55, resulting in accumulation of bits and pieces of wall material in the channel 50, the edges 49 of the channel are rounded; thus, repeated threading and rethreading of the head will not injure or otherwise disturb the puncture opening in the wall 55. The water may be completely shut off by threading the shank far enough into th hose so that the wall 55 of the conduit contacts the unthreaded portion 42 of the shank 40. Since in most applications the water escaping from a fluid distribution head, such as that shown at 25, is to be utilized as a "soaker" or "bubbler", it is desirable that the velocity of the water stream be reduced as nearly as possible to zero consonant with the volume of water to be supplied to the corresponding water utilization area. The dome-shaped cap 45 is positioned above the fluid channel 50 and is thus positioned to intercept the stream of water flowing out the channel 50 and redirect the stream, thus greatly reducing its velocity and prevent errosion of the ground at the water utilization area through the action of high velocity water.

Referring now to FIGS. 6 and 7, a modified form 60 of the fluid distribution head 25 is shown. The fluid distribution head 60 incorporates a shank 61 that is threaded as at 62 and includes a conduit-piercing point 64 at one end thereof. The shank 61 also includes an unthreaded portion 67 terminating in a cap 68. It may be seen that the cap is solid as opposed to the dome-shaped structure of the previous embodiment, but incorporates a plurality of circular ridges 70 formed in the bottom surface thereof for intercepting the water stream emanating upwardly thereagainst and redirecting the stream to reduce the water velocity. A slot 71 is formed in the shank 61 and extends entirely through the shank. The slot is substantially longitudinal with respect to the shank and includes a double-tapered upper wall 72 for assisting in redirecting water emanating from the head. The embodiment shown in FIGS. 6 and 7 is utilized in the identical manner as that described in connection with the previous figures.

The head may be placed along the hose or conduit at any convenient location and used to puncture and subsequently threadily engage the conduit to provide an adjustable fluid distribution head when water pressure is applied within the conduit.

Referring now to FIGS. 8 and 9, another modified fluid distribution head 80 is shown. The head 80 incorporates a cap 81, an unthreaded shank portion 82, a threaded shank portion 83, and threads 84 as in the previous embodiments; however, the bottom surface 87 of the cap 81 is smooth, and to provide the water velocity reduction a separate member or washer 89 is positioned adjacent and abutting the surface 87, the washer, including a depending ridge 91 extending downwardly therefrom to prevent lateral escape of the water stream as it strikes the bottom surface of the washer.

The head includes a fluid channel 93 that is formed of a slot extending entirely through the shank 83 and may be seen to extend at an angle to the longitudinal axis of the shank. Also, the slot incorporates a tapered upper surface or wall 97 while the shank includes a conduit-piercing point 98 at the end thereof. The operation and utilization of the fluid distribution head of the embodiment of FIGS. 8 and 9 is identical as described in connection with the previous figures.

Referring now to FIG. 10, it may be seen that the head 100 is an inverted dish-shaped member secured to the shank 101. A second washer 102 abuts the wall of the hose and is also dish-shaped with the remaining portion thereof extending upwardly in opposition to the head 100. In this embodiment, water emanating from the slot strikes the dish member 100 and is directed downwardly against the dish member 102; the effect of the two members is to effectively reduce the water velocity and provide a "bubbler" effect.

Figure 11:
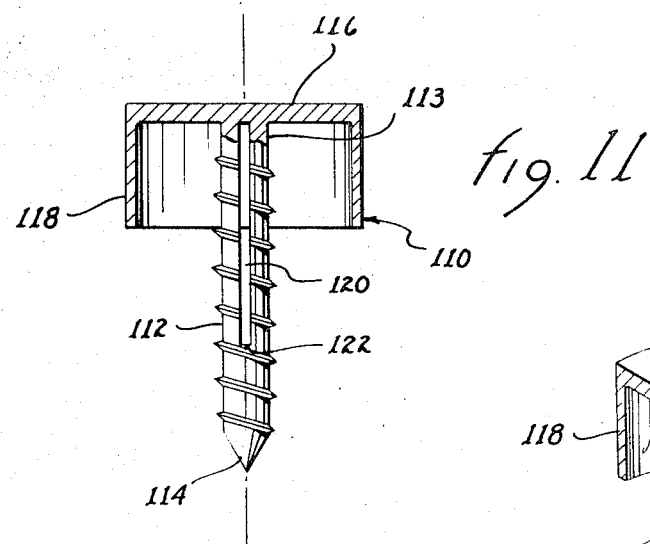
FIG. 11 is a side elevational view, partly in section, of a modified fluid distribution head.
Figure 12:
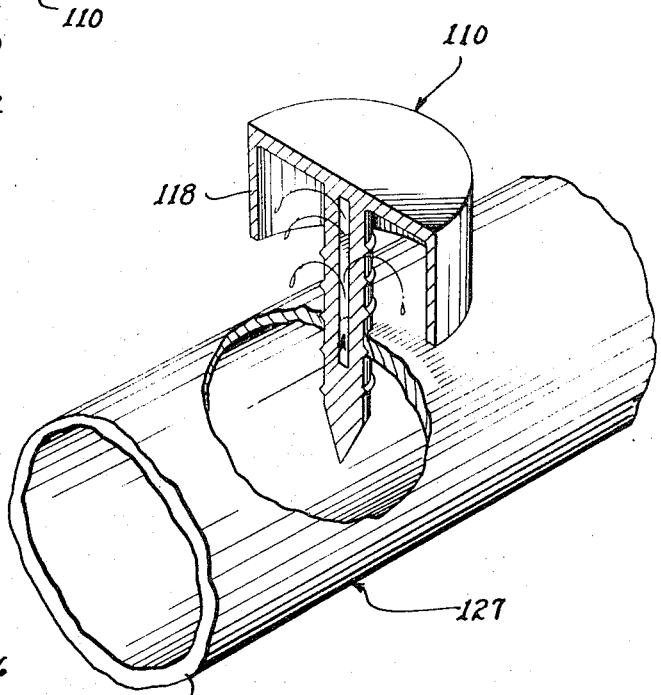
FIG. 12 is a perspective view, partly in section, of the fluid distribution head of FIG. 11, showing the head in position in a fluid conduit.
Figure 13:
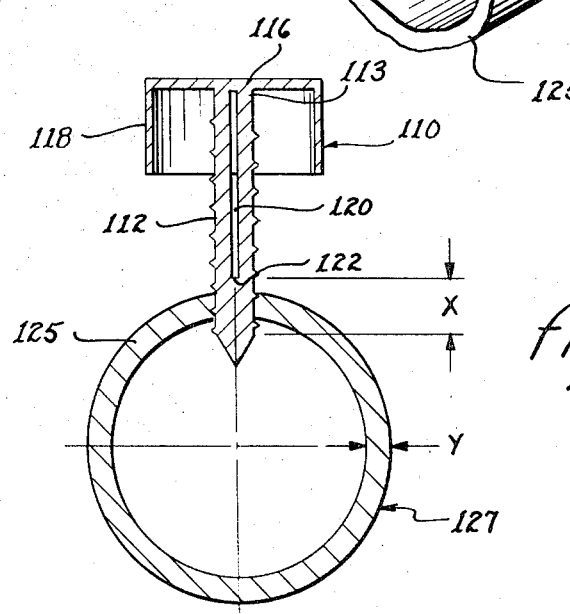
FIG. 13 is a side elevational view, partly in section, of the fluid distribution head of FIG. 11, showing the head positioned in the "off" position in a fluid conduit.

Referring now to FIGS. 11, 12, and 13, a fluid distribution head 110 is shown having a threaded shank 112 with top and bottom ends 113 and 114 respectively. A cap 116 is secured to the top end 113 of the shank 112 while the cap incorporates a skirt 118 depending downwardly therefrom for deflecting water, as will be described hereinafter. A slot 120 extends from beneath the skirt to a point 122 above the bottom end 114 of the shank. The slot 120 may extend entirely through the shank 112 such as the slot 71 shown in the embodiment of FIG. 6, or it may extend only partially through the shank, such as the fluid channel 50 shown in the embodiment in FIG. 3.

The distance from the point 122 positioned above the bottom end 114 of the shank 112 (distance "x" shown in FIG. 13) is at least equal to the thickness of the wall 125 of the conduit 127 into which the fluid distribution head 110 is to be inserted (the distance "y" shown in FIG. 13). It may therefore be seen that when the fluid distribution head 110 is threaded into the conduit 127, no water will escape from the conduit through the slot 120 until the head has been threaded into a depth to permit the lower portion of the slot 120 to extend into the interior of the conduit 125. As the head 110 continues to be threaded into the conduit 125, a greater area of the slot 120 is exposed to the interior of the conduit, thereby permitting a greater rate of fluid to escape through the slot upwardly and outwardly of the conduit to thereby contact the cap 16 and be directed downwardly by the cap and specifically the skirt 118 thereof. To shut the water off, the head 110 is unscrewed from the conduit 125; as the head is thus turned in a counterclockwise direction, the volume of water escaping continuously decreases until the water is finally shut off when the portion between the lower end 114 and the point 122 (the portion identified as "x" in FIG. 13) level with the wall 125 of the conduit 127. The shut off position is indicated in FIG. 13, wherein it may be seen that the portion identified as "x" contacts the wall 125 and effectively prevents water from escaping. The utilization of the distribution head of FIGS. 11 – 13 provides a "natural" valving arrangement, wherein threading the head further into the conduit causes a progressively greater volume of water to flow out of the conduit and a counterclockwise or unthreading motion of the fluid distribution head results in the progressive decreasing of the volume rate of flow until the water flow through the distribution head is completely cut off.

The system and method of the present invenion, while providing great flexibility to the utilization of bubbler or soaker systems, may actually take the form of inexpensive semi-permanent installations; for example, the pictorial illustration of FIG. 1 could become a semi-permanent installation simply by covering the hose with a shallow layer of dirt, thus taking the place of an expensive and complex bubbler system. It will be apparent to those skilled in the art that many modifications may be made to the embodiment described above that nevertheless will be within the spirit of the present invention.

I claim:

1. Apparatus for distributing water from a conduit having water therein under pressure, said apparatus extending through the walls of said conduit, said apparatus comprising: a threaded shank, having top and bottom ends, for threadily engaging the walls of said conduit; a cap attached to said top end, said cap having a skirt extending downwardly for deflecting water; means defining a channel in said shank for the passage of water, said channel extending from beneath said skirt to a point above said bottom end, the distance from said point to said bottom end being at least equal to the thickness of the wall of said conduit, whereby threading said shank into said conduit causes water to flow out of said conduit through said channel, and unthreading said shank decreases the water flow through said channel.

2. The combination set forth in claim 1, wherein said conduit is flexible and wherein each of said heads includes a conduit-piercing point at said bottom end.

3. The combination set forth in claim 1, wherein said channel forms a slot extending through said shank.

4. In combination, a flexible conduit for transporting water from a source under pressure, said conduit having a plurality of unthreaded punctures at desired intervals therealong; a plurality of fluid distribution heads for threadily engaging said unthreaded punctures in said conduit; each of said heads including a threaded shank, having top and bottom ends, for threadily engaging said unthreaded punctures in said conduit, a cap attached to said top end, said cap having a skirt extending downwardly for deflecting water, means defining a channel in said shank for the passage of water, said channel extending from beneath said skirt to a point above said bottom end, the distance from said point to said bottom end being at least equal to the thickness of a wall of said conduit; whereby said heads may be threaded into or out of said conduit to adjust the rate of flow of the water out of said conduit through said unthreaded puncture.

* * * * *